United States Patent [19]

Forrest

[11] 4,326,465
[45] Apr. 27, 1982

[54] AUTOMOBILE TOW WHEEL ATTACHMENT

[76] Inventor: Sid Forrest, Rte. 2, Box 144, Bartlesville, Okla. 74003

[21] Appl. No.: 153,329

[22] Filed: May 27, 1980

[51] Int. Cl.³ .................. B61B 9/00; B61B 13/12; B61C 11/02
[52] U.S. Cl. .................. 104/165; 46/206; 104/61; 104/88; 104/140; 104/172 B; 104/226; 104/243; 172/26; 188/5; 198/472; 273/86 R
[58] Field of Search .......... 104/140, 166, 243, 247, 104/287, 61, 66, 88, 120, 165, 172 B, 173 R, 193, 202, 226; 105/215 C; 46/206; 172/26; 188/4 B, 5; 198/472; 238/10 E; 273/86 F

[56] References Cited

U.S. PATENT DOCUMENTS

| | | | |
|---|---|---|---|
| 406,300 | 7/1889 | Pendleton et al. | 104/226 |
| 737,190 | 8/1908 | Wright | 104/61 |
| 2,068,403 | 1/1937 | Ekstrom | 104/247 X |
| 2,179,515 | 11/1939 | Norton | 188/5 |
| 2,468,158 | 4/1949 | Bartholomew | 104/247 |
| 2,816,516 | 12/1957 | Diehl | 104/88 |
| 2,836,129 | 5/1958 | Jaeger | 104/120 |
| 2,841,249 | 7/1958 | Allen | 188/5 X |
| 3,179,066 | 4/1965 | Koshobu | 105/215 C |
| 3,356,040 | 12/1967 | Fonden | 104/172 B X |
| 3,650,216 | 3/1972 | Harwick et al. | 104/88 X |
| 3,842,752 | 10/1974 | Harwick | 104/287 X |

Primary Examiner—Joseph F. Peters, Jr.
Assistant Examiner—Howard Beltran
Attorney, Agent, or Firm—William S. Dorman

[57] ABSTRACT

A tow wheel attachment for an automobile and which is used in conjunction with an underground conveyor system comprising a tubular metal frame having a base, a pair of legs extending divergently outwardly from the base and a horizontal crossbeam interconnecting the legs intermediate their ends; a wheel rotatably mounted on the base; a pair of brake disks disposed on appropriate sides of the wheel; a pair of mounting brackets affixed to the outer ends of the legs for the purpose of attaching the frame to the lower surface of the automobile; and a hydraulic cylinder connected at one end to the frame and at its other end to the center of the crossbeam for the purpose of lowering and raising the frame.

4 Claims, 4 Drawing Figures

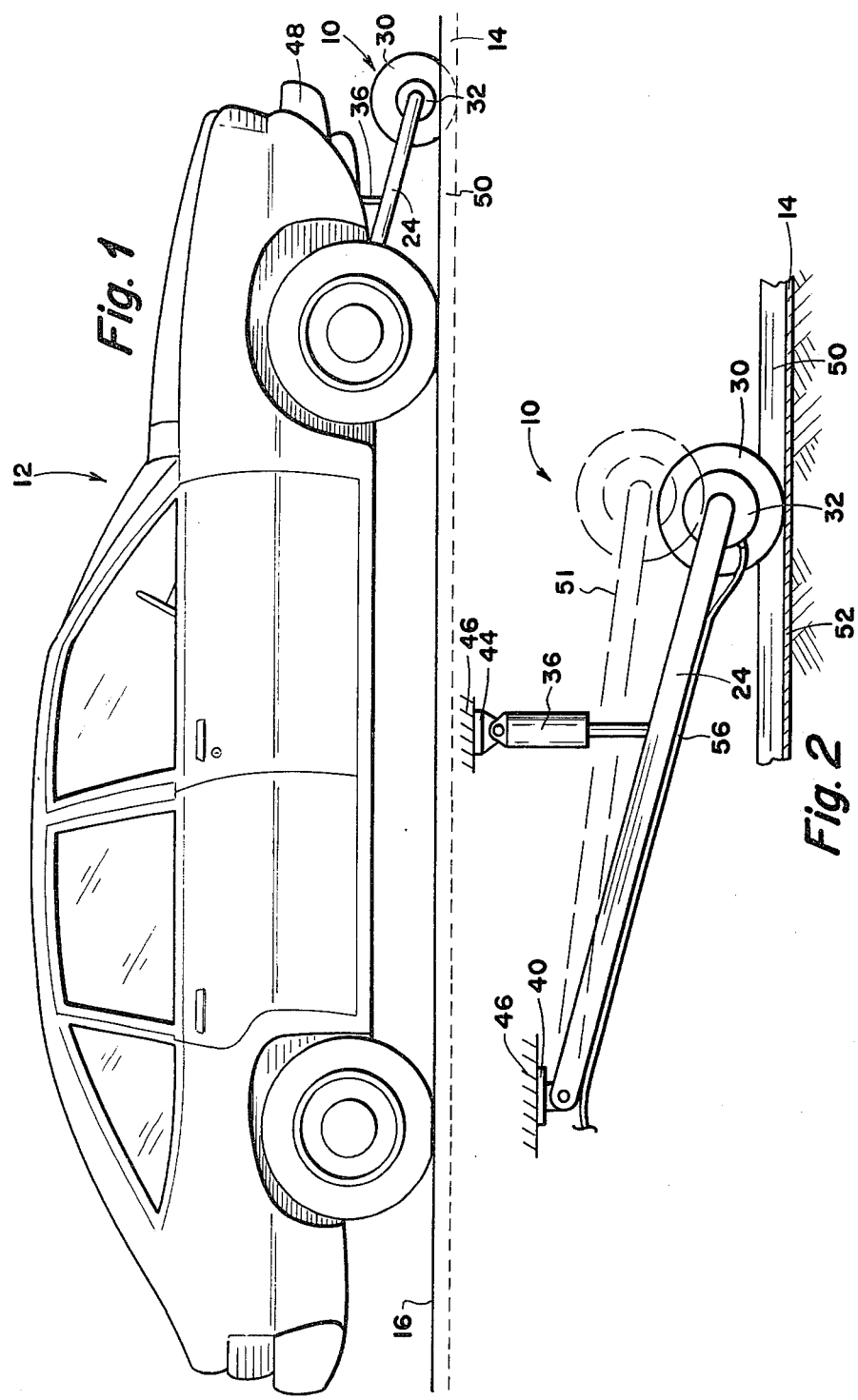

AUTOMOBILE TOW WHEEL ATTACHMENT

BACKGROUND OF THE INVENTION

1. Field of the Invention

The present invention relates to a device or attachment for moving passive vehicles such as automobiles or the like, and more particularly to a tow wheel attachment affixed to a conventional car or truck. The tow wheel attachment allows a car to be transported along a highway or road equiped with a compatible conveyor system without using its own energy source.

2. Prior Art

Transportation systems for a variety of passive vehicles are well known in the prior art. A prior art patent, U.S. Pat. No. 3,842,752 to Harwick, discloses a speed control device or attachment for a unit carrier system. The unit carrier system contains a plurality of remotely controlled cars driven over a closed trackway which is commonly used in warehouses and factories. No prior art device discloses an attachment for a conventional automobile which provides a means for the automobile to be transported along a highway without using an individual energy source.

SUMMARY OF THE INVENTION

The present invention relates to a tow wheel attachment affixed to a portion of a conventional automobile or car and which is to be used in conjunction with a conveyor system built into a highway or road. The tow wheel attachment allows the car (or the like) to be transported along the highway as a passive vehicle by suitable means which uses the energy source of the conveyor system.

The tow wheel attachment of the present invention comprises an inverted A-shaped tubular metal frame, a wheel rotatably received on the base or axle portion of the frame and disposed between a pair of brake disks or drums, and a hydraulic cylinder or jack connected to the center of the crossbeam of the frame. The frame is provided with three hinged mounting brackets two of which are affixed to the outer ends of a pair of legs extending divergently away from the base of the frame. The third mounting bracket is affixed to the upper end of the hydraulic jack. The tow wheel is mounted, by means of three brackets, on the lower surface or frame of the car so as to dispose the wheel beneath the front end of the car and directly above the channel or central rut of the conveyor system.

The hinged mounting brackets at the ends of the legs allow the frame and the attached wheel to be lowered and raised by means of the hydraulic jack. The car, with the tow wheel attachment mounted in place, is positioned so that it straddles the channel, trough, or central rut of the conveyor system. The trough is mounted on a movable conveyor disposed beneath the level of the road. The configuration of the channel is such that it engages the wheel of the present invention.

The frame and the wheel are lowered into the channel by activating the hydraulic jack. The lower end of the wheel rests on top of the channel such that the sides of the channel are closely adjacent the sides of the wheel. The wheel is locked by means of the two brake disks which are activated by a hydraulic brake line mounted on one of the legs and which connects the disks to suitable controls in the car.

Once the wheel is engaged in the channel and locked by the disks, the car is moved along the road by the conveyor which is remotely controlled and powered. To disengage the car from the conveyor, the wheel is unlocked and the hydraulic cylinder is activated to raise the frame thus raising the wheel out of the channel and above the road level. The automobile can then be used normally.

BRIEF DESCRIPTION OF THE DRAWINGS

FIG. 1 is a side elevational view of a conventional automobile on a highway with the tow wheel device of the present invention attached thereto;

FIG. 2 is a side elevational view of the tow wheel device;

DETAILED DESCRIPTION OF THE PREFERRED EMBODIMENTS

The present invention provides a means of converting a conventional automobile or car into a passive vehicle capable of being transported along a highway which has been equiped with a suitable conveyor system. Referring to FIG. 1, the present invention relates to a tow wheel attachment or assembly 10 which is affixed to the lower surface of a conventional automobile or car 12, and which is used in conjunction with a conveyor system 14 built into a highway or road 16.

Figure 4:
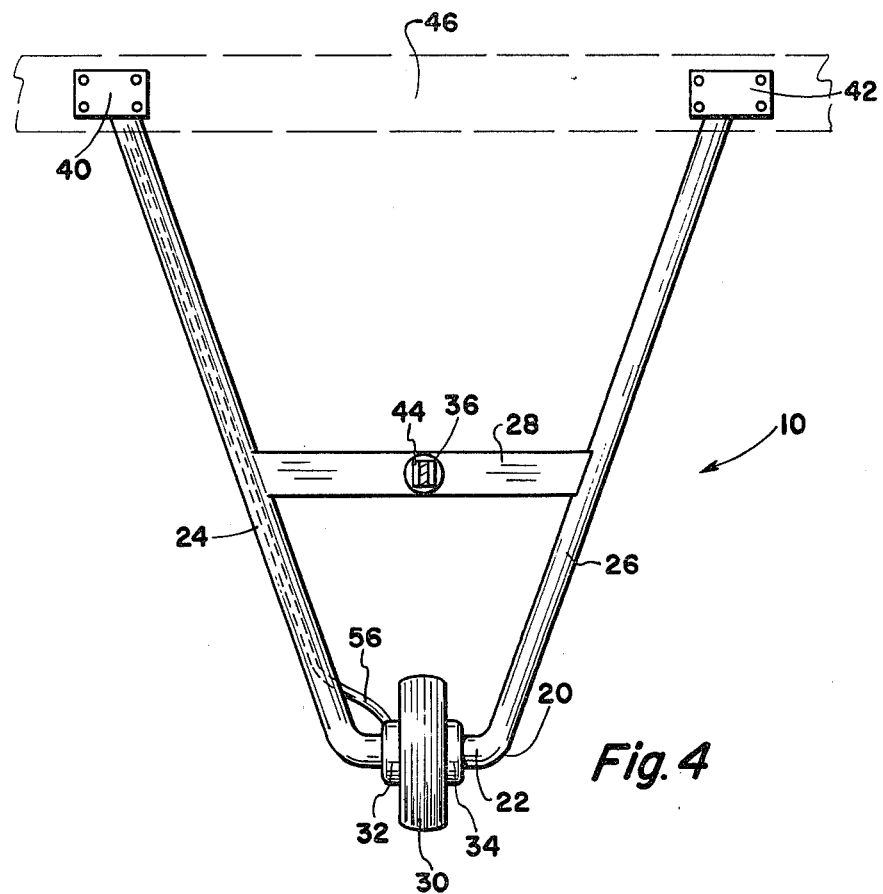
FIG. 4 is a plan view of the tow wheel device taken along section line 4—4 of FIG. 3.
Figure 3:
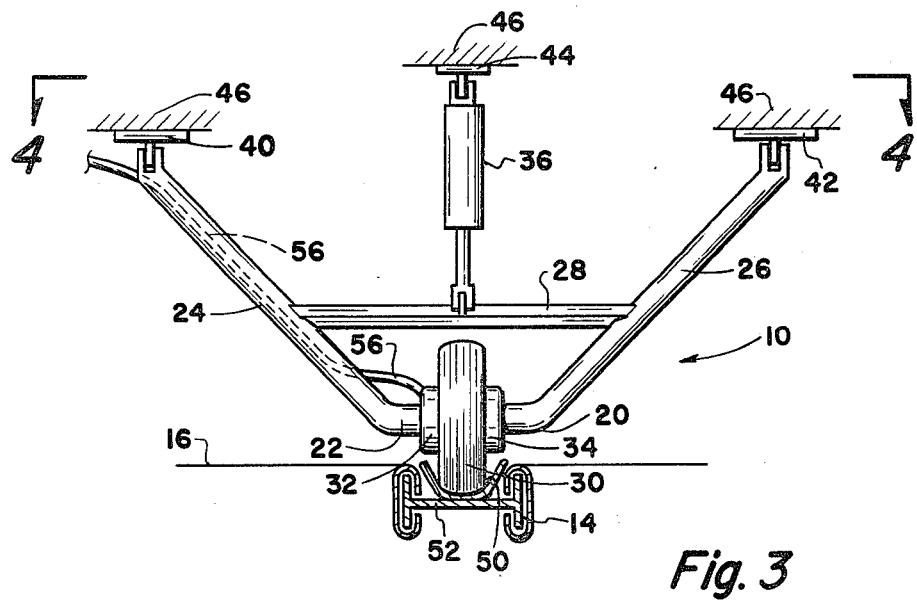
FIG. 3 is a front elevational view of the tow wheel device.

As shown in FIGS. 3 and 4, tow wheel assembly 10 comprises an inverted A-shaped tubular metal frame 20 having a horizontally disposed base or axle 22, a pair of legs, 24 and 26, extending divergently outwardly (upwardly) from base 22, and a horizontally disposed crossbeam 28 interconnecting legs 24 and 26 at a point approximately one third their length from the base. A wheel 30 is rotatably received on base 22 and is disposed between a pair of brake disks or drums 32 and 34. A hydraulic cylinder jack 36, whose purpose will be disclosed hereinafter, is to the center of crossbeam 28.

Frame 20 is provided with two hinged mounting brackets, 40 and 42, which are affixed to the outer ends of legs 24 and 26, respectively. A third hinged mounting bracket 44 is affixed to the upper end of hydraulic jack 36. These three mounting brackets, 40, 42, and 44, are mounted on the lower surface or frame 46 of car 12 by conventional means (such as bolts). As shown, wheel 30 is disposed beneath the front end 48 of the car and directly above the channel or central trough 50 of conveyor system 14.

Referring to FIG. 2, the hinged mounting brackets 40 and 42 at the ends of the legs allow frame 20 and the attached wheel to be lowered down into channel 50 by activating hydraulic jack 36. The wheel can also be raised out of the channel and away from the road as shown by dotted line 51. The jack can be operated manually or from remote controls with the car (not shown). The car, with the two wheel assembly mounted in place, is positioned so that car 12 straddles conveyor system 14. Central channel 50 is mounted on a movable metal conveyor 52 disposed beneath the level of road 16. Conveyor 52 is powered by a remote energy source (not shown). The configuration of channel 50 is such that it engages wheel 30 (see FIG. 3).

Hydraulic jack 36 is activated to lower frame 20 away from the car thus inserting the wheel into the channel 50 of conveyor system 14. As shown in FIG. 3, the lower end of wheel 30 rests on the bottom of the channel 50 and the sides of the channel are closely adjacent the sides of the wheel. The wheel is locked by means of the two brake disks, 32 and 34, which are activated by a hydraulic brake line 56 mounted on leg 22 and which is connected to suitable controls (not shown) in the car. Once the wheel is engaged in the channel and is locked by the brake disks, the car travels along the road by means of a conveyor 52. The conveyor pulls the wheel and subsequently the car along some predetermined course.

To disengage the car from the conveyor, the wheel is unlocked and the hydraulic cylinder is activated to raise the frame thereby lifting the wheel out of the channel and above the road level. The automobile can now be used conventionally Whereas the present invention has been described in particular relation to the drawings attached hereto, it should be understood that other and further modifications, apart from those shown or suggested herein, may be made within the spirit and scope of this invention.

What is claimed is:

1. In combination with a conventional automobile movable along a highway as a passive vehicle; an externally powered conveyor system having a continuously moving channel disposed beneath the surface of said highway and movable longitudinally beneath said surface; a tow wheel attachment mounted on said automobile and comprising a tubular metal frame having a lower horizontal axle, a pair of legs extending divergently outwardly away from said axle and a horizontally disposed crossbeam interconnecting said legs intermediate their ends, a single wheel freely rotatably mounted on said axle; locking means for preventing rotation of said wheel on said axle; means for pivotally attaching said legs to a lower surface of said automobile; and means pivotally interposed between said crossbeam and said lower surface of said automobile for lowering and raising said frame whereby, when said automobile is positioned over said conveyor system to straddle said channel, the lowering of said frame brings said wheel into engagement with said channel, and upon locking said wheel causes said automobile to be pulled along said highway as a passive vehicle by the channel.

2. The combination of claim 1 wherein said locking means comprises a pair of brake disks mounted on said axle on opposite sides of said wheel and being activated by a hydraulic control line.

3. The combination of claim 1 wherein said means for lowering and raising said frame comprises a hydraulic cylinder connected at its lower end to said crossbeam and connected at its upper end to said lower surface of said automobile.

4. The combination of claim 1 wherein said means for attaching said frame to said lower surface of said automobile comprises a pair of hinged mounting brackets affixed to the ends of said legs.

* * * * *